United States Patent Office 3,342,839
Patented Sept. 19, 1967

3,342,839
REACTION PRODUCTS OF CERTAIN ANHYDRIDES AND 1 - HALOPHENYL - 1 - β - HYDROXYALKYLUREAS
Gustav Steinbrunn, Schwegenheim, Pfalz, Adolf Fischer, Mutterstadt, Pfalz, Guenter Scheuerer, Ludwigshafen, Rhine, and Herbert Stummeyer, Limburgerhof, Pfalz, Germany, assignors to Badische Anilin- & Soda-Fabrik Aktiengesellschaft, Ludwigshafen (Rhine), Germany
No Drawing. Filed Oct. 14, 1964, Ser. No. 403,925
Claims priority, application Germany, Oct. 18, 1963, B 73,924
4 Claims. (Cl. 260—346.8)

This invention relates to agents for the selective control of unwanted vegetation growing between crop plants. More particularly, it relates to the selective control of unwanted vegetation growing among cotton plants.

It is known that tetrasubstituted ureas and especially those which bear a hydroxyalkyl group together with a phenyl radical on a nitrogen atom may be used as active ingredients for herbicides (U.S. Patent 3,113,968). It is also known that the esters of these active ingredients with low molecular weight fatty acids, which may be substituted with halogen, also have herbicidal activity. They have the disadvantage however that their activity persists for too long a period, a property which is unfavorable for their use in agriculture. Moreover, they are not sufficiently selective as regards crop plants, e.g. cotton.

We have now found that agents which contain reaction products of dicarboxylic or tetracarboxylic anhydrides, with ureas having the formula

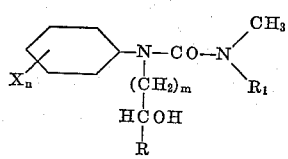

where $R_1$ denotes an alkyl, alkenyl, alkoxy or alkynyl group having 1 to 5 carbon atoms, R denotes hydrogen, an alkyl or alkenyl group having 1 to 4 carbon atoms or a chloroalkyl group, X denotes hydrogen, halogen, an alkyl or haloalkylene group having 1 to 4 carbon atoms or an alkoxy, nitro, cyano, thiocyano, alkylthio or carbalkoxy group, $n$ denotes 1, 2 or 3, the radicals X being identical or different, and $m$ denotes 1 or 2, or salts thereof, are valuable selective herbicides especially for controlling unwanted vegetation among cotton and beans.

The reaction products, which are sirupy or crystalline, may readily be converted into the agents for controlling unwanted vegetation by adding emulsifiers or dispersing agents, e.g. alkoxylation products of higher alcohols, alkoxyphenols and alkoxynaphthols or high molecular weight fatty acid amidoalkyl sulfates. The reaction products may also be used in the form of their salts, e.g. alkali metal, alkaline-earth metal or ammonium salts, heavy-metal or complex salts or salts of organic amines, e.g. of alkoxylated or low molecular weight amines, some of which are water-soluble.

The hydroxyalkylated ureas required as starting materials for the preparation of the active substances are known and may be prepared by conventional methods in the presence of acid-binding agents from, for example, N-hydroxyethylanilines,
N-β-hydroxypropylanilines,
N-β-hydroxybutenylanilines,
N-hydroxyalkylmonochloroanilines,
N-hydroxyalkyldichloroanilines,
N-hydroxyalkylmonofluoroanilines,
N-hydroxyalkylmonobromoanilines,
N-hydroxyalkylmonochloromonofluoroanilines,
N-hydroxyalkylmonochloromonobromoanilines,
N-hydroxyalkylalkoxyanilines,
N-hydroxyalkylalkoxymonochloroanilines,
N-hydroxyalkylmonochlorotoluidines,
N-hydroxyalkyltrichloromethylanilines,
N-hydroxyalkyltrifluoromethylanilines,
N-hydroxyalkylnitroanilines,
N-hydroxyalkyl-monochloronitroanilines,
N-hydroxyalkylcyanoanilines,
N-hydroxyalkylthiocyanoanilines,
N-hydroxyalkylcarbomethoxyanilines,
N-hydroxyalkylcarboethoxyanilines,
N-hydroxyalkylalkylthioanilines,
dialkylaminocarbamates and
dialkylaminocarbamic chlorides.

The substituted ureas are dissolved in inert solvents, e.g. hydrocarbons, chlorinated hydrocarbons or ethers, and reacted with an equivalent amount of, for example, maleic anhydride in solid form or dissolved in a solvent. The reaction is accelerated by heating the solutions and, if desired, by adding catalysts, e.g. polyphosphoric acids, arylsulfonic acids or alkylamino salts. On completion of the reaction the solvents may be removed in a vacuum and the reaction products thus obtained mixed with emulsifiers and dispersing agents. To prepare the salts, the solutions of the reaction products may be reacted, while stirring, with an equivalent amount of the metal hydroxides, oxides or carbonates, in the presence or absence of a small amount of water, or, if the amino salts are to be prepared, with an equivalent amount of an organic amine. The salts may also be prepared from water-soluble heavy-metal salts and water-soluble alkali metal salts of the reaction products. On completion of the reaction the solvents are removed in a vacuum. The reaction products are solid; some are hygroscopic.

Examples of dicarboxylic and tetracarboxylic anhydrides are: succinic, maleic, citraconic, glutaric, phthalic, pyromellitic, naphthalic and diphenic anhydrides. The anhydrides of substituted acids are also suitable, e.g. the anhydrides of hydrogenated, chlorinated and/or nitrated phthalic acids, chlorinated succinic acids, monochloromaleic acid, dichloromaleic acid, and chlorinated and/or nitrated naphthalic or diphenic acids.

The reaction products may be used in the form of free acids or as salts, as far as they are not water-soluble, in dispersed form, either alone or together with other active substances, e.g. urea derivatives, carbamates, halogenated fatty acids, triazines, uracils, or boron and arsenic derivatives. The water-soluble salts of the reaction products may also be used, either alone or in admixture with the active substances mentioned above.

The following examples serve to illustrate the activity of the reaction products.

*Example 1*

In a greenhouse, N-p-chlorophenyl-N'-dimethylurea (III), the reaction product of maleic anhydride and N-β-hydroxypropyl-N-p-chlorophenyl-N'-dimethylurea (II) and its sodium salt (I) were sprayed, in amounts corresponding to 2 kg. per hectare, on *Triticum sativum* (wheat), *Gossypium* spp. (cotton), *Avena fatua* (wild oats), *Alopecurus myosuroides* (slender foxtail), *Dactylis glomerata* (orchard grass), *Sinapis alba* (white mustard), and a mixture of weeds comprising *Chenopodium album* (lamb's-quarters), *Stellaria media* (chickweed), *Rumex acetosa* (sour dock), *Vicia* spp. (vetch), *Sinapis alba* (white mustard), *Galium aparine* (cleavers), *Urtica urens* (small nettle) and *Galinsoga parviflora* (gallant soldier). The active substances had been dissolved, or dispersed with the addition of sodium lignin sulfonate, in amounts of water corresponding to 600 liters per hectare. At the time of treatment the plants had a height of 4 to 12 cm. The effect was determined after two weeks. The results are shown in the following table:

| Plants | Active substance | | |
|---|---|---|---|
| | I | II | III |
| Wheat | 25 | 30 | 90 to 100 |
| Cotton | 0 to 5 | 0 to 100 | 70 to 80 |
| Wild oats | 80 | 70 to 80 | 70 to 80 |
| Slender foxtail | 80 to 90 | 80 to 90 | 80 to 90 |
| Orchard grass | 90 | 80 to 90 | 80 |
| White mustard | 90 to 100 | 100 | 90 to 100 |
| Mixture of weeds | 90 to 100 | 100 | 90 to 100 |

0=no damage; 100=total destruction.

As may be seen from the table, active substances I and II have good herbicidal activity while having substantially better compatibility, especially with cotton, than active substance III.

Example 2

In a greenhouse, N-p-chlorophenyl-N'-dimethylurea (III), the reaction product of maleic anhydride and N-β-hydroxypropyl-N-p-chlorophenyl-N'-dimethylurea (II) and its sodium salt (I) were tested, by the pre-emergence method, on *Phaseolus vulgaris* (kidney bean), *Glossypium* spp. (cotton), *Oryza sativa* (rice), *Alopecurus myosuroides* (slender foxtail), *Avena fatua* (wild oats), *Dactylis glomerata* (orchard grass), *Sinapis alba* (white mustard), and a mixture of weeds comprising *Chenopodium album* (lamb's-quarters), *Stellaria media* (chickweed), *Rumex acetosa* (sour dock), *Vicia* spp. (vetch), *Sinapis alba* (white mustard), *Galium aparine* (cleavers), *Urtica urens* (small nettle), and *Galinsoga parviflora* (gallant soldier). The active substances had been dissolved, or dispersed with the addition of sodium lignin sulfonate, in amounts of water corresponding to 600 liters per hectare. The soil was treated with the active substances prior to seeding. Their effect was determined after four weeks. The results are shown in the following table:

| Plants | Active substance | | |
|---|---|---|---|
| | I | II | III |
| Kidney beans | 0 to 10 | 0 to 10 | 40 to 50 |
| Rice | 20 | 25 | 40 |
| Cotton | 0 | 0 | 20 to 30 |
| Slender foxtail | 90 to 100 | 90 to 100 | 75 |
| Wild oats | 90 | 90 to 100 | 90 |
| Orchard grass | 80 to 90 | 90 to 100 | 80 |
| White mustard | 100 | 100 | 100 |
| Mixture of weeds | 100 | 100 | 100 |

0=no damage; 100=total destruction.

As is evident from the table, the herbicidal activity of active substances I and II is just as good as that of N-p-chlorophenyl-N'-dimethylurea (III); however, active substances I and II have better compatibility with kidney beans, rice and cotton.

The reaction products of succinic or citraconic anhydride and N-β-hydroxypropyl-N-p-chlorophenyl-N'-dimethylurea and their metal or amino salts, applied by the pre-emergence or post-emergence method, have similar activity to that of the reaction products with maleic anhydride.

We claim:
1. A compound selected from the group consisting of (I) the reaction product of equivalent amounts of (a) a urea having the formula

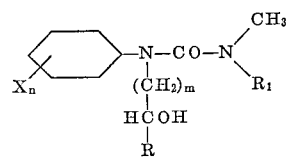

and (b) a carboxylic anhydride selected from the group consisting of succinic, maleic, citraconic, glutaric, phthalic, pyromellitic, naphthalic, diphenic, hydrogenated phthalic, chlorinated phthalic, nitrated phthalic, chlorinated succinic, monochloromaleic, dichloromaleic, chlorinated naphthalic, nitrated naphthalic, chlorinated diphenic, and nitrated diphenic anhydrides and (II) the salts of said reaction product selected from the group consisting of alkali metal, alkaline earth metal, and ammonium, $R_1$ denoting an alkyl having from one to five carbon atoms, R denoting a radical selected from the group consisting of hydrogen and alkyl having from one to four carbon atoms, X denoting a radical selected from the group consisting of hydrogen, halogen, and alkyl having from one to four carbon atoms, and a nitro, cyano, and thiocyano group, $n$ denoting one of the integers 1, 2 and 3, the radicals X being identical or different, and $m$ denoting one of the integers 1 and 2.

2. The reaction product of equivalent amounts of maleic anhydride and 1-p-chlorophenyl-1-β-hydroxypropyl-3,3-dimethylurea.

3. The reaction product of equivalent amounts of succinic anhydride and 1-p-chlorophenyl-1-β-hydroxypropyl-3,3-dimethylurea.

4. The reaction product of equivalent amounts of citraconic anhydride and 1-p-chlorophenyl-1-β-hydroxypropyl-3,3-dimethylurea.

References Cited
UNITED STATES PATENTS

| 2,651,620 | 9/1953 | Hill et al. | 260—553 |
| 2,795,610 | 6/1957 | Gerjovich | 260—45.9 |
| 2,876,088 | 3/1959 | Hill et al. | 71—2.6 |

ALEX MAZEL, *Primary Examiner.*

HENRY R. JILES, *Examiner.*

JOSEPH A. NARCAVAGE, *Assistant Examiner.*

UNITED STATES PATENT OFFICE
CERTIFICATE OF CORRECTION

Patent No. 3,342,839                        September 19, 1967

Gustav Steinbrunn et al.

It is hereby certified that error appears in the above numbered patent requiring correction and that the said Letters Patent should read as corrected below.

Column 3, in the first table, third column, line 2 thereof for "0 to 100" read -- 0 to 10 --.

Signed and sealed this 28th day of January 1969.

(SEAL)
Attest:

Edward M. Fletcher, Jr.                      EDWARD J. BRENNER
Attesting Officer                               Commissioner of Patents